(12) United States Patent
Pennazza et al.

(10) Patent No.: US 11,872,883 B2
(45) Date of Patent: Jan. 16, 2024

(54) POWERTRAIN FOR A MOTOR VEHICLE AND CONTROL METHOD THEREOF

(71) Applicant: DAYCO EUROPE S.R.L., Chieti (IT)

(72) Inventors: Mario Pennazza, Pescara (IT); Olivier Boehm, La Garenne Colombes (FR)

(73) Assignee: Dayco Europe S.R.L., Chieti (IT)

(*) Notice: Subject to any disclaimer, the term of this patent is extended or adjusted under 35 U.S.C. 154(b) by 0 days.

(21) Appl. No.: 17/757,153

(22) PCT Filed: Dec. 11, 2020

(86) PCT No.: PCT/IB2020/061848
§ 371 (c)(1),
(2) Date: Jun. 10, 2022

(87) PCT Pub. No.: WO2021/117006
PCT Pub. Date: Jun. 17, 2021

(65) Prior Publication Data
US 2022/0410689 A1    Dec. 29, 2022

(30) Foreign Application Priority Data
Dec. 12, 2019 (IT) .......................... 102019000023805

(51) Int. Cl.
*B60K 25/02* (2006.01)
*B60K 6/26* (2007.10)
*B60K 6/485* (2007.10)
*F02N 11/00* (2006.01)
*B60K 25/00* (2006.01)

(52) U.S. Cl.
CPC ................ *B60K 25/02* (2013.01); *B60K 6/26* (2013.01); *B60K 6/485* (2013.01); *F02N 11/006* (2013.01); *B60K 2006/268* (2013.01); *B60K 2025/005* (2013.01); *B60K 2025/022* (2013.01)

(58) Field of Classification Search
CPC .............. B60K 25/02; B60K 2025/005; B60K 2025/022
See application file for complete search history.

(56) References Cited

U.S. PATENT DOCUMENTS

| | | | |
|---|---|---|---|
| 2012/0191283 A1* | 7/2012 | Kothari | B60K 6/445 180/65.265 |
| 2013/0066492 A1* | 3/2013 | Holmes | B60W 20/10 180/65.265 |
| 2014/0130635 A1* | 5/2014 | Kees | F02N 15/08 474/101 |

OTHER PUBLICATIONS

PCT/IB2020/061848, International Search Report and Written Opinion, dated Mar. 12, 2021 (14 pages).

* cited by examiner

*Primary Examiner* — Jonathan R Matthias
(74) *Attorney, Agent, or Firm* — FisherBroyles, LLP; Susan M. Oiler

(57) ABSTRACT

A powertrain has an internal combustion engine provided with an accessory transmission that includes a first pulley connected to a crankshaft of the engine, a second pulley connected to a shaft of an electric machine, and a belt connecting the first and the second pulleys to each other to rotate in the same direction of rotation (R). The electric machine is operated to supply an active torque to the second pulley during start-up of the internal combustion engine by means of a starter motor.

5 Claims, 3 Drawing Sheets

POWERTRAIN FOR A MOTOR VEHICLE AND CONTROL METHOD THEREOF

CROSS-REFERENCE TO RELATED APPLICATIONS

This patent application is filed under 35 U.S.C. § 371 as the U.S. National Phase of International Patent Application No. PCT/IB2020/061848, filed Dec. 11, 2020, which designated the U.S. and which claims the benefit of Italian patent application no. 102019000023805, filed on Dec. 12, 2019, the entire disclosure of which is incorporated herein by reference.

TECHNICAL FIELD

The present invention concerns a powertrain for a motor vehicle and a method for the control of said powertrain.

The present invention is preferably but not exclusively applied in a hybrid powertrain, which will be referred to hereinafter without any loss of generality.

BACKGROUND ART

As is known, hybrid traction vehicles comprise an internal combustion engine and at least one electric machine which can be used as a generator or as a motor to deliver torque in combination with (or alternatively to) the internal combustion engine, according to the vehicle operating conditions.

A configuration in which an electric machine is used connected between the internal combustion engine and the vehicle transmission is conventionally called "P2". Modular units are known designed to be interposed between the internal combustion engine and the transmission of a vehicle (and therefore currently called "P2 modules"), which comprise, in addition to the electric machine, one or more clutches to selectively connect to the transmission the internal combustion engine and/or the electric machine, as well as the relative actuators and transmission elements.

Powertrains for motor vehicles provided with an accessory drive arranged on one end of the internal combustion engine opposite the transmission (normally indicated by "front end", or "P0") are also known. The accessory drive, generally a belt drive, connects one or more accessories to the crankshaft. Said accessories typically comprise an electric machine operating as an alternator and/or motor and a compressor for the air conditioning system, and the accessory drive comprises respective pulleys connected to the crankshaft and to each of the accessories, a belt cooperating with the above-mentioned pulleys and a tensioner designed to ensure a minimum belt tension.

If the electric machine is used exclusively as an alternator (generator), it is common practice to interpose between the same and the relative pulley a one-way joint or free wheel, having the object of transmitting the torque from the pulley to the electric machine when the latter is driven by the engine, but allowing the electric machine to override the pulley in the transitory operating conditions in which this can occur (for example in the case of a sudden deceleration of the crankshaft. This prevents the high inertia of the electric machine subjecting the belt to undesired tension peaks.

If on the other hand, as occurs increasingly frequently, the electric machine is used also as a motor, the use of a free wheel as described above is not possible, since the electric machine must be able to receive or transmit torque to the relative pulley according to the operating conditions.

In this case, to ensure a minimum belt tension in all operating conditions, a dual tensioner is used having a first tensioner pulley acting on the belt span upstream of the electric machine and a second tensioner pulley acting on the belt span downstream of the electric machine, since both spans can be the slack span according to the operating conditions.

The known solutions described above can be combined so as to produce a hybrid powertrain having an electric machine in position P0 (below: the electric machine P0) and an electric machine in position P2 (below: the electric machine P2); the two machines can be used with different control strategies (for example one only as motor, the other in a reversible manner).

Furthermore, the internal combustion engine can be started by means of the electric machine P0, the electric machine P2 or by means of a third electric machine (a traditional starter motor) associated with the engine flywheel.

For example, if the electric machine P0 is used only as a motor and the internal combustion engine is started by means of the electric machine P2 or the starter motor, the tension of the accessory drive belt can reach unacceptable minimum values, as can be seen in FIG. 3, which can determine noisiness and premature wear of the belt.

DISCLOSURE OF INVENTION

The object of the present invention is to produce a powertrain that solves the above-mentioned problem.

The above-mentioned object is achieved by an accessory drive, such as a powertrain for a vehicle that has an internal combustion engine, a first electric machine operating at least as a starter motor and located on a first side of the internal combustion engine facing in use towards the transmission, a control unit, and an accessory drive that includes a first pulley connected to one end the engine's crankshaft on a second side of the engine opposite in use to the transmission, a second electric machine located on the second side of the internal combustion engine, a second pulley connected to the second electric machine, and a belt connecting the first and at least the second pulley together to rotate in the same direction of rotation as the crankshaft. The control unit is programmed to control the second electric machine to transmit an active torque to the second pulley during start-up of the internal combustion engine by means of the first electric machine, thereby maintaining a predetermined minimum tension level in a span of the belt between the first and the second pulleys.

The present invention also concerns a control method of the powertrain. The method includes driving the second electric machine to transmit an active torque to the second pulley during start-up of the internal combustion engine by means of the first electric machine, thereby maintaining a predetermined minimum tension level in a span of the belt between the first and the second pulleys in the direction of rotation.

BRIEF DESCRIPTION OF THE DRAWINGS

For a better understanding of the present invention, a preferred embodiment is described, by way of non-limiting example and with reference to the attached drawings, in which.

BEST MODE FOR CARRYING OUT THE INVENTION

Figure 1:
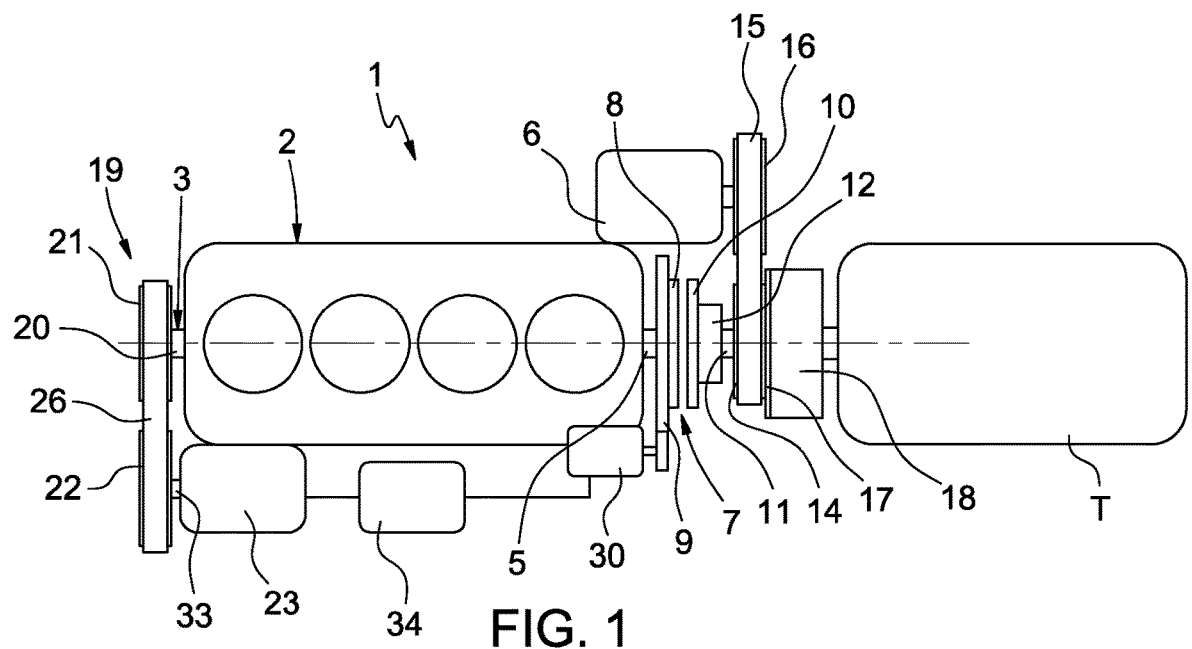
FIG. 1 is a schematic plan view of a powertrain according to the present invention.

With reference to FIG. 1, the number 1 indicates overall a powertrain for a motor vehicle.

The powertrain 1 comprises an internal combustion engine 2 (below, for the sake of brevity, "heat engine 2") having a crankshaft 3 and a hybrid module 4.

The hybrid module 4 is interposed, in use, between the heat engine 2 and a transmission T of the vehicle, and is connected to one end 5 of the crankshaft 3 facing the transmission T.

The hybrid module 4 comprises an electric machine 6 and a decoupling clutch 7 designed to selectively connect the electric machine 6 to the crankshaft 3 and to the transmission T.

The clutch 7 comprises at least a clutch plate 8 axially fixed and rotationally integral with a flywheel 9 connected at the end 5 of the crankshaft 3, and a plate 10 axially movable and rotationally integral with an intermediate shaft 11 of the module 4. The clutch 7 lastly comprises a hydraulic actuator 12 acting on the plate 10 for control of the clutch.

The intermediate shaft 11 is connected to a pulley 14 by means of a torsional vibration damper of known type and not illustrated, housed inside the pulley.

The pulley 14 is connected by a belt 15 to a pulley 16 connected to the electric machine 6.

A flex plate 17 is fixed to the pulley 14, said plate constitutes an output member of the module 4 designed to be connected to a torque converter 18 constituting an input member of the transmission T.

The powertrain 1 lastly comprises an accessory transmission 19 connected to one end 20 of the crankshaft 3 opposite the end 5.

Figure 2:
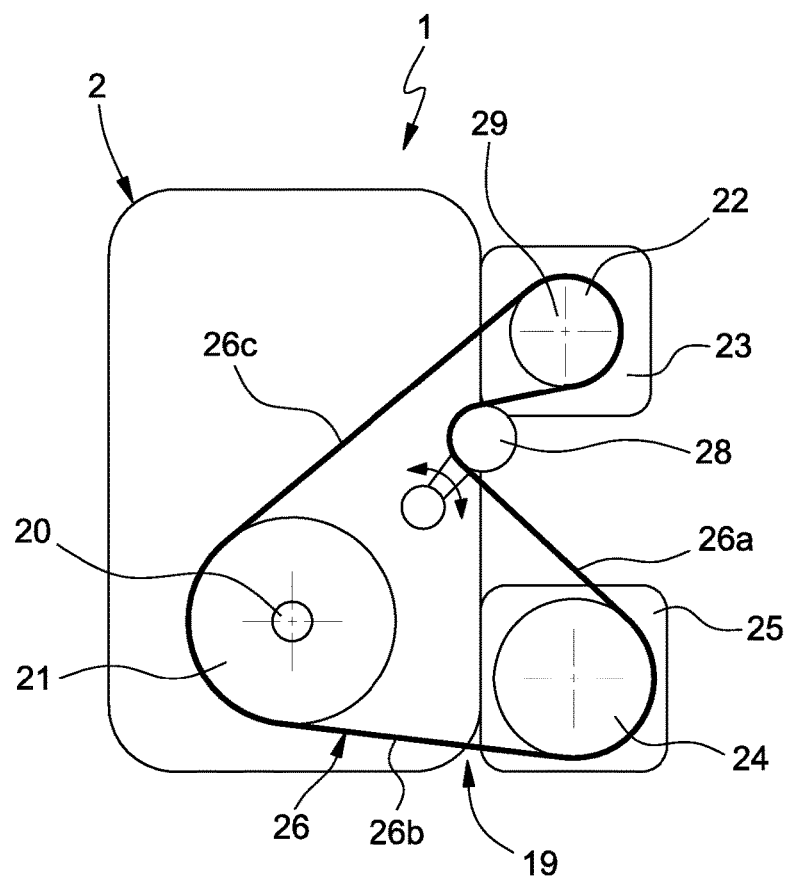
FIG. 2 is a schematic frontal view of the powertrain according to the present invention.

The accessory transmission 19 (FIG. 2) comprises a first pulley 21 fixed to the end 20 of the crankshaft 3, a second pulley 22 associated with a second electric machine 23 and a third pulley 24 to drive a compressor 25 of a conditioning system. The three pulleys 21, 22 and 24 are connected to one another by a belt 26. A conventional tensioner 28 acts on a span 26a of the belt 26 comprised between the second pulley 22 and the third pulley 24. The pulleys 21, 22 and 24 rotate in the same direction of rotation R indicated by an arrow in FIG. 3 and coinciding with the direction of rotation of the crankshaft 3.

The powertrain 1 comprises a third electric machine 30 operating as a starter motor, provided with an output pinion 31 that engages with a toothing of the flywheel 9. Expediently, the third electric machine 30 is a brushless motor able to rapidly start the heat engine 2.

The powertrain 1 lastly comprises a programmable control unit 34, which controls the electric machines in response to input signals representing the operating conditions of the powertrain 1 and of the driver controls.

The operation of the powertrain 1 is the following.

When the clutch 7 is closed, the intermediate shaft 11 is connected both to the heat engine 2 and to the electric machine 6 and to the vehicle transmission T.

In this condition, the control unit 34 can operate the electric machine 6 both as generator (to recharge the battery during the thermal traction, or as a regenerative brake), and as a motor for the delivery of an additional torque (boosting) in combination with the electric machine 23, according to the operating conditions. The specific control logics of the electric machines are not described here since they do not form part of the invention.

When the clutch 7 is open, the electric machine 6 can be used for the electric traction, electric braking and coasting with the heat engine off.

The heat engine 2 is started (both cold and starting from a condition of electric traction) by means of the third electric machine 30. During this phase, the clutch 7 is open.

During starting of the heat engine 2, the electric machine 30 drives the crankshaft 3 and the first pulley 21 connected to it.

According to the present invention, to prevent the tension dropping below predetermined levels in the span 26c of the belt 26, immediately downstream of the first pulley 21 in the direction of movement of the belt, the electric machine 23 is operated by the control unit 34 so as to supply an active torque to the pulley 22. This additional torque causes an increase in the tension in span 26c of the belt 26, and therefore eliminates the technical problem highlighted.

Figure 3:
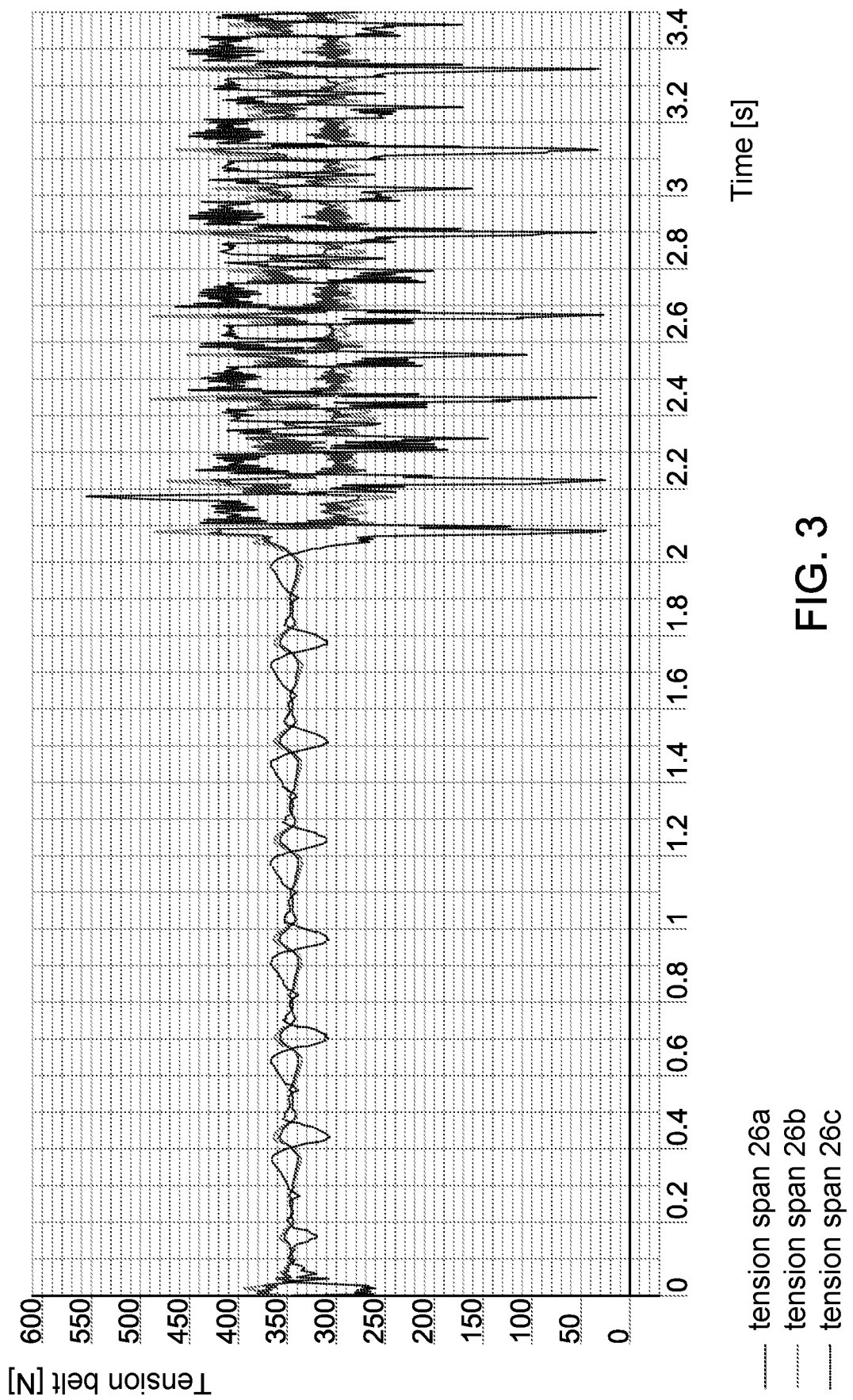
FIG. 3 is a graph that shows the tension variations of the belt in an accessory drive of a conventional powertrain.
Figure 4:
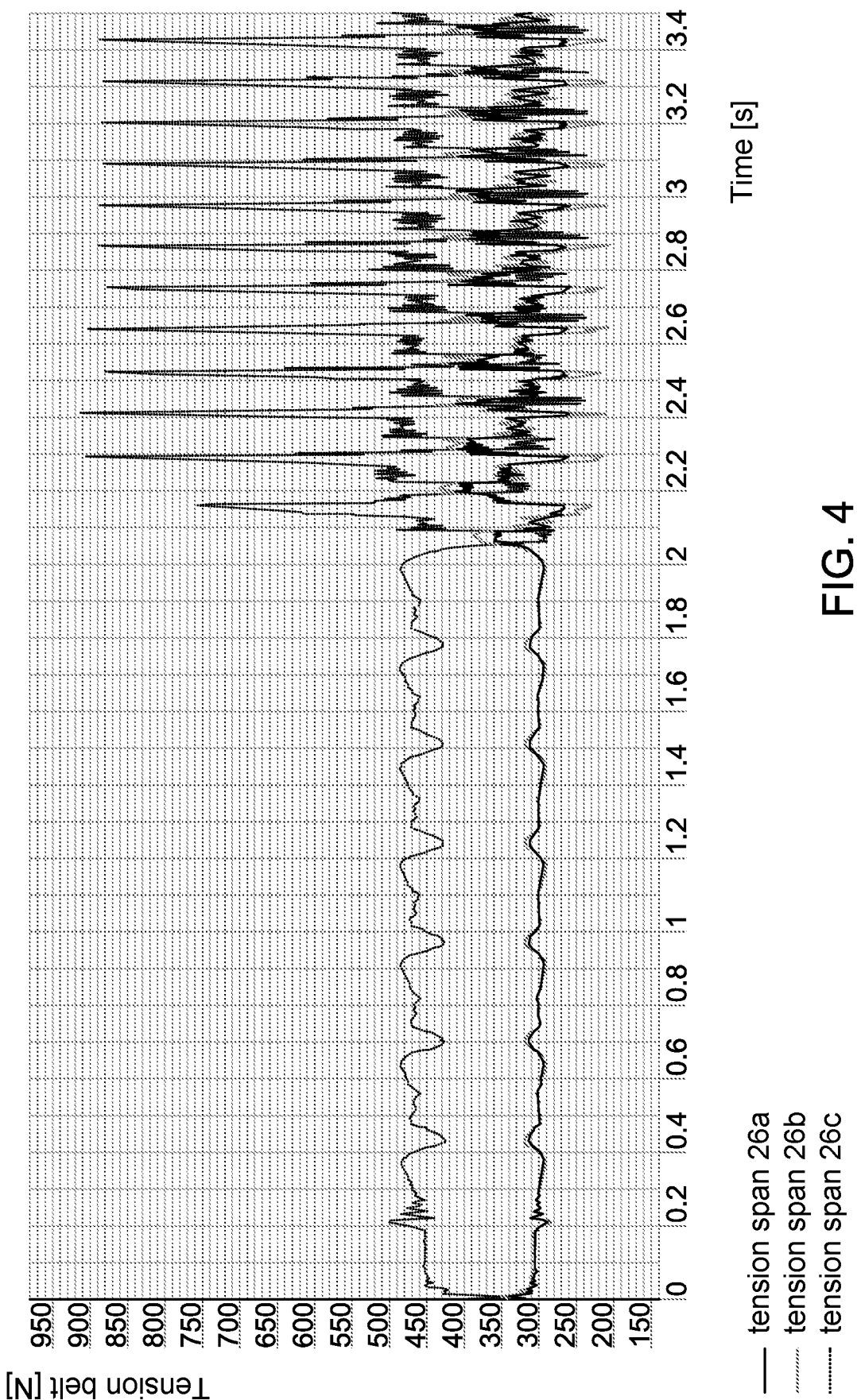
FIG. 4 is a graph that shows the belt tension variations in an accessory drive of the powertrain according to the present invention.

For a better understanding of the effect of the additional torque according to the present invention, FIGS. 3 and 4 illustrate the trend of the tension of the belt 26 in an accessory transmission of a conventional powertrain, and in the accessory transmission of the powertrain of the invention.

In particular, the tensions are measured in the three spans 26a, 26b and 26c arranged respectively between the pulleys 22 and 24, between the pulleys 24 and 21, and between the pulleys 21 and 22, and shown in the graphs as a function of the time. In the time interval between 0 and 2 s the trend of the tensions is observed with the heat engine off (driven by the electric machine 6); as from 2 s the trend of the tensions is observed in the starting phase of the heat engine 2 by means of the electric motor 30.

As can be easily seen in FIG. 3, with a mean belt tension value in the order of approximately 350 N when the motor is driven, significant tension oscillations occur at start-up in the belt span 26c, in the order of approximately 400 N peak-peak, with minimum peak values in the order of 20-30 N. Such low values, essentially due to the inertia of the electric machine 23 in the presence of the torsional vibrations induced by the combustion at start-up, can determine slipping and noise.

FIG. 4 illustrates the trend of said tensions in the presence of the additional torque transmitted by the electric machine 23 to the pulley 22 simultaneously with start-up by means of the electric motor 30.

The value of the active torque to be transmitted to the pulley 22 can be easily determined experimentally. For example, for a three-cylinder engine with 1.0 l displacement, the active torque necessary is in the order of only 5 Nm. The active torque must be maintained only for the duration of the first ignition cycles of the engine; once a stable combustion regime has been reached, the active torque is no longer necessary and can be interrupted.

From FIG. 4 the effect of increase in the tension values in span 26c of the belt 26 is evident, with minimum peak values in the order of 210 N.

Lastly, it is clear that modifications and variations can be made to the powertrain 1 described that do not depart from the scope defined by the claims.

The invention claimed is:

1. Powertrain for a vehicle comprising:
an internal combustion engine provided with a crankshaft;
a first electric machine operating at least as a starter motor and located on a first side of the internal combustion engine facing in use towards a transmission (T) of the vehicle;
an accessory drive comprising:
   a first pulley connected to one end of the crankshaft on a second side of the engine opposite in use to the transmission of the vehicle;
   a second electric machine located on the second side of the internal combustion engine;
   a second pulley connected to the second electric machine;
   a third pulley connected to an accessory of the internal combustion engine,
   a belt connecting the first, the second, and the third pulleys together to rotate in the same direction of rotation (R) as the crankshaft; and
   a tensioner acting on a span of the belt between the second pulley and the third pulley; and
a control unit
programmed to control the second electric machine so as to transmit an active torque to said second pulley during start-up of the internal combustion engine by means of the first electric machine, so as to maintain a predetermined minimum tension level in a span of the belt comprised between the first and the second pulleys in said direction of rotation.

2. Powertrain as claimed in claim 1, comprising a hybrid module equipped with an additional electric machine and a decoupling clutch designed to selectively connect the additional electric machine to the crankshaft.

3. Powertrain as claimed in claim 2, wherein the additional electric machine is reversible and can be operated as a motor or as a generator depending on the operating conditions, and wherein the second electric machine is used as a motor.

4. Method of control of a powertrain as claimed in claim 1, comprising driving the second electric machine to transmit an active torque to said second pulley during start-up of the internal combustion engine by means of the first electric machine, so as to maintain a predetermined minimum tension level in a span of the belt between the first and the second pulleys in said direction of rotation.

5. Method of control as claimed in claim 4, wherein the powertrain comprises a hybrid module equipped with an additional electrical machine and a decoupling clutch designed to selectively connect the additional electrical machine to the crankshaft, the method including the steps of operating said additional electrical machine as a motor or as a generator depending on the operating conditions, and of operating the second electrical machine as a motor.

* * * * *